(12) United States Patent
Wu et al.

(10) Patent No.: US 10,002,281 B2
(45) Date of Patent: *Jun. 19, 2018

(54) FINGERPRINT IDENTIFICATION MODULE

(71) Applicant: Gingy Technology Inc., Hsinchu (TW)

(72) Inventors: Jen-Chieh Wu, Hsinchu (TW);
Cheng-Jyun Huang, Hsinchu (TW);
Yu-Cheng Chiu, Hsinchu (TW)

(73) Assignee: Gingy Technology Inc., Hsinchu (TW)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/662,238

(22) Filed: Jul. 27, 2017

(65) Prior Publication Data

US 2017/0323144 A1    Nov. 9, 2017

Related U.S. Application Data

(63) Continuation-in-part of application No. 14/973,686, filed on Dec. 17, 2015, now Pat. No. 9,754,150.
(Continued)

(30) Foreign Application Priority Data

Oct. 19, 2015  (TW) .............................. 104134209 A (51) Int. Cl.
*G06K 9/00* (2006.01)
*B32B 7/12* (2006.01)

(52) U.S. Cl.
CPC ............ *G06K 9/00046* (2013.01); *B32B 7/12* (2013.01); *B32B 2307/42* (2013.01)

(58) Field of Classification Search
None
See application file for complete search history.

(56) References Cited

U.S. PATENT DOCUMENTS 6,011,860 A    1/2000  Fujieda et al.
6,061,463 A    5/2000  Metz et al.
(Continued)

FOREIGN PATENT DOCUMENTS

CN    102844769    12/2012
CN    104063094    9/2014
(Continued)

OTHER PUBLICATIONS

Ichiro Fujieda et al.,"Fingerprint input based on scattered-light detection",Applied Optics,vol. 36, No. 35, Dec. 10, 1997,pp. 9152-9156.
(Continued)

*Primary Examiner* — Andrae S Allison
(74) *Attorney, Agent, or Firm* — JCIPRNET (57) ABSTRACT

A fingerprint identification module including a cover plate, a fingerprint identification sensor, a first adhesive layer, and at least one light source is provided. The cover plate has an inner surface, an outer surface opposite to the inner surface, and a plurality of microstructures located at the inner surface. The fingerprint identification sensor is located under the microstructures and attached to the microstructures through the first adhesive layer, wherein the first adhesive layer is adhered between a portion of the microstructures and a portion of the fingerprint identification sensor, and an air gap is located between the other portion of the microstructures and the other portion of the fingerprint identification sensor. The at least one light source is located under the inner surface and adjacent to the fingerprint identification sensor.

18 Claims, 7 Drawing Sheets

Related U.S. Application Data (60) Provisional application No. 62/190,267, filed on Jul. 9, 2015.

(56) References Cited

U.S. PATENT DOCUMENTS

| | | | | |
|---|---|---|---|---|
| 9,754,150 | B2* | 9/2017 | Wu | G06K 9/0004 |
| 2013/0034274 | A1* | 2/2013 | Wu | G06K 9/00046 |
| | | | | 382/124 |
| 2016/0247010 | A1* | 8/2016 | Huang | G02B 5/20 |
| 2016/0328597 | A1* | 11/2016 | Abiko | G06K 9/3233 |
| 2016/0335470 | A1* | 11/2016 | Park | H01L 24/32 |
| 2016/0358005 | A1* | 12/2016 | Jiang | G06K 9/0002 |
| 2016/0379039 | A1* | 12/2016 | Dagan | G06F 3/0412 |
| | | | | 382/124 |
| 2017/0011251 | A1* | 1/2017 | Wu | G06K 9/0004 |
| 2017/0017824 | A1 | 1/2017 | Smith et al. | |
| 2017/0061193 | A1* | 3/2017 | Young | G06K 9/00013 |
| 2017/0083745 | A1* | 3/2017 | Goodelle | G06K 9/00053 |
| 2017/0091506 | A1 | 3/2017 | Sinha et al. | |
| 2017/0109561 | A1* | 4/2017 | Wyrwas | G06K 9/00053 |
| 2017/0109564 | A1* | 4/2017 | Seo | G06K 9/00087 |

FOREIGN PATENT DOCUMENTS

| | | |
|---|---|---|
| CN | 204406424 | 6/2015 |
| EP | 2447883 | 5/2012 |
| EP | 2555137 | 2/2013 |
| TW | 201032145 | 9/2010 |

OTHER PUBLICATIONS

"Search Report of European Counterpart Application," dated Dec. 7, 2016, p. 1-p. 6, in which the listed references were cited.

\* cited by examiner

FINGERPRINT IDENTIFICATION MODULE

CROSS-REFERENCE TO RELATED APPLICATION

This application is a continuation-in-part application of and claims the priority benefit of U.S. application Ser. No. 14/973,686, filed on Dec. 17, 2015, now allowed. The prior U.S. application Ser. No. 14/973,686 claims the priority benefits of U.S. provisional application Ser. No. 62/190,267, filed on Jul. 9, 2015 and Taiwan application serial no. 104134209, filed on Oct. 19, 2015. The entirety of each of the above-mentioned patent applications is hereby incorporated by reference herein and made a part of this specification.

BACKGROUND

Field of the Invention

The invention is directed to an optical module and more particularly, to a fingerprint identification module.

Description of Related Art

With increasing advancement in technology industry, electronic apparatuses, such as tablet computers and smart phones have been widely applied in everyday life. Each electronic apparatus is commonly set with a password lock to enhance security of use. However, in order to unlock the password lock, a user has to input a password every time before using the electronic apparatus. To mitigate the burden of inputting the passwords during unlocking in the related art and to improve convenience and security of the use of the electronic apparatus, manufacturers start to study how to install a fingerprint identification module in the electronic apparatus for identity identification by using unique fingerprint information of human fingers.

SUMMARY

The invention is directed to a fingerprint identification module with good identification performance.

The invention provides a fingerprint identification module, including a cover plate, a fingerprint identification sensor, a first adhesive layer, and at least one light source. The cover plate has an inner surface, an outer surface opposite to the inner surface, and a plurality of microstructures located at the inner surface. The fingerprint identification sensor is located under the microstructures and attached to the microstructures through the first adhesive layer, wherein the first adhesive layer is adhered between a portion of the microstructures and a portion of the fingerprint identification sensor, and an air gap is located between the other portion of the microstructures and the other portion of the fingerprint identification sensor. The at least one light source is located under the inner surface and adjacent to the fingerprint identification sensor.

In an embodiment of the invention, the cover plate is a cover plate of a display apparatus disposed on the fingerprint identification module or a cover plate of a touch apparatus disposed on the fingerprint identification module.

In an embodiment of the invention, the microstructures are hollow structures recessed in the inner surface.

In an embodiment of the invention, the microstructures are prism structures or columnar structures protruding from the inner surface.

In an embodiment of the invention, the microstructures and the cover plate are integrally formed.

In an embodiment of the invention, the fingerprint identification module further includes a second adhesive layer, and the microstructures are attached to the inner surface of the cover plate through the second adhesive layer.

In an embodiment of the invention, the first adhesive layer includes a ring structure disposed between the microstructures and the fingerprint identification sensor, and the air gap is surrounded by the ring structure.

In an embodiment of the invention, the fingerprint identification module further includes a second adhesive layer. The microstructures are attached to the inner surface of the cover plate through the second adhesive layer.

In an embodiment of the invention, the fingerprint identification module further includes a display element, a second adhesive layer, and a third adhesive layer. The display element is located between the cover plate and the microstructures. The microstructures are attached to the display element through the second adhesive layer. The display element is attached to the cover plate through the third adhesive layer.

In an embodiment of the invention, the fingerprint identification module further includes an optical element layer and a fourth adhesive layer. The optical element layer is located between the microstructures and the fingerprint identification sensor. The fingerprint identification sensor is attached to the optical element layer through the fourth adhesive layer, and the optical element layer, the fourth adhesive layer, and the fingerprint identification sensor are attached to the microstructures through the first adhesive layer.

In an embodiment of the invention, the optical element layer includes a pinhole array element, a fiber array element, an anti-spy film, a light diffraction element, or a polarizer.

The invention provides a fingerprint identification module, including a cover plate, a fingerprint identification sensor, an optical element layer, a first adhesive layer, a second adhesive layer, and at least one light source. The cover plate has an inner surface, an outer surface opposite to the inner surface, and a plurality of microstructures located at the inner surface. The fingerprint identification sensor is located under the microstructures. The optical element layer is located between the microstructures and the fingerprint identification sensor, and the optical element layer is attached to the microstructures through the first adhesive layer. The fingerprint identification sensor is attached to the optical element layer through the second adhesive layer. The at least one light source is located under the inner surface and adjacent to the fingerprint identification sensor.

In an embodiment of the invention, the optical element layer includes a pinhole array element, a fiber array element, an anti-spy film, a light diffraction element, or a polarizer.

In an embodiment of the invention, the first adhesive layer is located between a portion of the microstructures and a portion of the fingerprint identification sensor, and an air gap is located between the other portion of the microstructures and the optical element layer located on the other portion of the fingerprint identification sensor.

In an embodiment of the invention, the fingerprint identification sensor is comprehensively covered by the first adhesive layer, and a refractive index of the first adhesive layer is less than a refractive index of each of the microstructures.

In an embodiment of the invention, the optical element layer includes a plurality of light guide elements, and the at least one light source is located between the light guide elements. The fingerprint identification module further includes a plurality of the fingerprint identification sensors. The fingerprint identification sensors are attached to the light guide elements through the second adhesive layer, respectively.

In an embodiment of the invention, each of the light guide elements includes an inclined surface tilted relative to the cover plate, and the inclined surface of each of the light guide elements is adjacent to the at least one light source.

In an embodiment of the invention, the optical element layer includes a plurality of microstructures, and a pitch of the microstructures of the optical element layer is smaller than a pitch of the microstructures located at the inner surface.

In an embodiment of the invention, the microstructures of the optical element layer and the microstructures located at the inner surface are columnar structures or columnar recesses.

To sum up, the invention can facilitate in improving the identification performance of the fingerprint identification module by collimating and focusing a light beam reflected by a finger on the fingerprint identification sensor with the disposition of the microstructures. A portion (e.g. the sensing area) of the fingerprint identification sensor is exposed by the first adhesive layer to prevent the transmission of the light beam from being affected, so that the identification performance of the fingerprint identification module is further improved. An optical element layer is disposed between the microstructures and the fingerprint identification sensor according to desired optical effects. Therefore, the fingerprint identification module of the invention can have good identification performance.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 to FIG. 7A are schematic partially cross-sectional diagrams respectively illustrating fingerprint identification modules according to a second embodiment to a seventh embodiment of the invention.

DESCRIPTION OF EMBODIMENTS

Figure 1A:
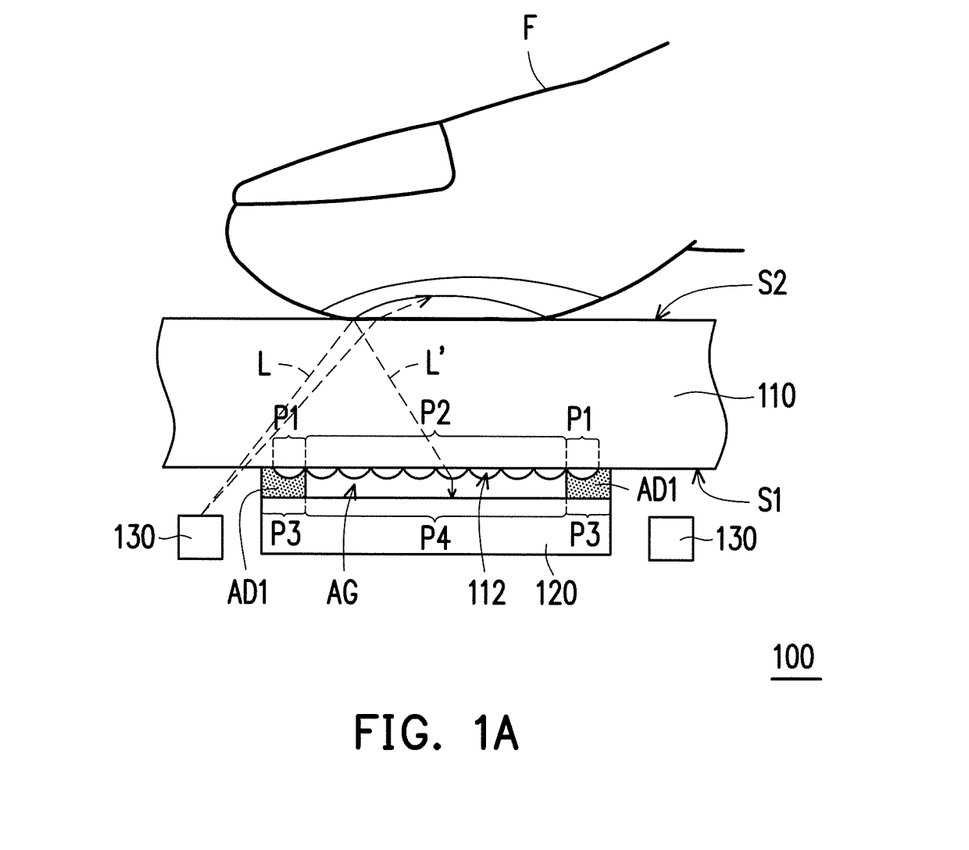
FIG. 1A is a schematic partially cross-sectional diagram illustrating a fingerprint identification module according to a first embodiment of the invention.
Figure 1B:
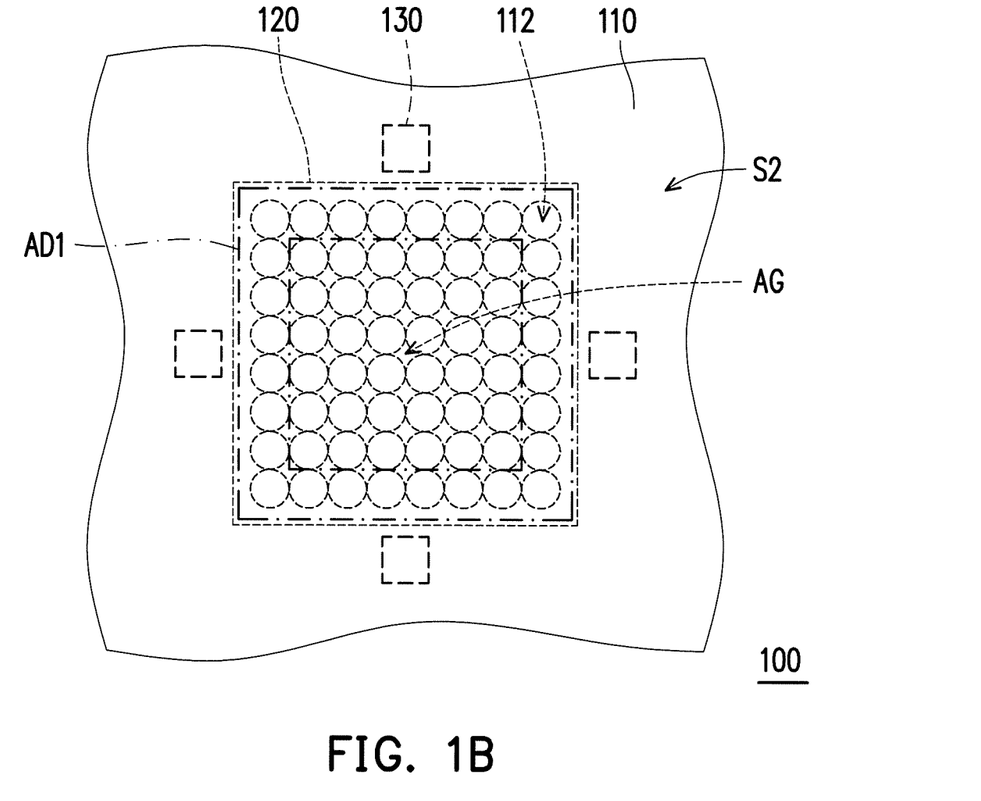
FIG. 1B is a schematic partially top-view diagram illustrating the fingerprint identification module according to the first embodiment of the invention.

FIG. 1A is a schematic partially cross-sectional diagram illustrating a fingerprint identification module according to a first embodiment of the invention. FIG. 1B is a schematic partially top-view diagram illustrating the fingerprint identification module according to the first embodiment of the invention. Referring to FIG. 1A and FIG. 1B, a fingerprint identification module 100 includes a cover plate 110, a fingerprint identification sensor 120, a first adhesive layer AD1, and at least one light source 130.

The cover plate 110 has an inner surface S1, an outer surface S2 and a plurality of microstructures 112. The outer surface S2 and the inner surface S1 are opposite to each other. The outer surface S2 is, for example, a touch operation surface of the fingerprint identification module 100. In other words, a user touches the outer surface S2 of the cover plate 110 with his/her finger F for fingerprint identification.

The cover plate 110 may employ a substrate with high mechanical strength to prevent elements under the cover plate 110 from being damaged due to the pressing of the finger F or other impact of an external force. In addition, the cover plate 110 may be made of a transparent material to prevent a light beam L emitted from the light source 130 from being shielded. The transparent material generally refers to a material with high transmittance, which is not limited to the material having transmittance of 100%. For example, the cover plate 110 may be a glass cover plate or a plastic cover plate.

In an embodiment, the cover plate 110 is a cover plate of a display apparatus (not shown) disposed on the fingerprint identification module 100 or a cover plate of a touch apparatus (not shown) disposed on the fingerprint identification module 100. Specifically, the fingerprint identification module 100 may be integrated with (stacked with) a display apparatus (or a touch apparatus). Compared to using the cover plate 110 to protect the fingerprint identification module 100 while using an additional cover plate to protect the display apparatus (or the touch apparatus), by using a single cover plate (i.e. the cover plate 110) to protect the fingerprint identification module and the display apparatus, the overall thickness of the integrated device is reduced, but the invention is not limited thereto.

The microstructures 112 are located at the inner surface S1 of the cover plate 110, and the microstructures 112 may be arranged in an array as shown in FIG. 1B, but the arrangement of the microstructures 112 is not limited to what is shown in FIG. 1B. Referring to FIG. 1A, the microstructures 112 and the cover plate 110 may be integrally formed. In addition, the microstructures 112 may be columnar structures protruding from the inner surface S1. For example, the microstructures 112 may be semi-cylindrical structures protruding from the inner surface S1, but the invention is not limited thereto.

The fingerprint identification sensor 120 is located under the microstructures 112. The fingerprint identification sensor 120 is adapted to receive the light beam L' reflected by the finger F, so as to identify the user's identify. For example, the fingerprint identification sensor 120 may be an optical fingerprint identification sensor or a photoelectric hybrid fingerprint identification sensor, but the invention is not limited thereto.

The fingerprint identification sensor 120 is attached to the microstructures 112 through the first adhesive layer AD1. Referring to FIG. 1A, only the first adhesive layer AD1 is disposed between the fingerprint identification sensor 120 and the microstructures 112. Two opposite surfaces of the first adhesive layer AD1 contact the fingerprint identification sensor 120 and the microstructures 112, respectively.

With the use of the collimation and focusing characteristics of the microstructures 112, intensity of light signals received by the fingerprint identification sensor 120 may be effectively increased, which contributes to improving the identification performance of the fingerprint identification module 100. Additionally, the fingerprint identification sensor 120 are directly attached to the microstructures 112 through the first adhesive layer AD1, and no other optical elements are needed to be disposed between the fingerprint identification sensor 120 and the inner surface S1, thus, an optical path length between the finger F and the fingerprint identification sensor 120 may be shortened, which contributes to reducing an amount of signal attenuation resulted from the optical path length. Therefore, the fingerprint identification module 100 can have good identification performance.

In the embodiment, the first adhesive layer AD1 is only partially adhered between the microstructures 112 and the fingerprint identification sensor 120. Specifically, the first adhesive layer AD1 is adhered between a portion P1 of the microstructures 112 and a portion P3 of the fingerprint identification sensor 120, and an air gap AG is located between the other portion P2 of the microstructures 112 and the other portion P4 of the fingerprint identification sensor 120. For example, the first adhesive layer AD1 includes a ring structure (see the point chain line in FIG. 1B) disposed between the microstructures 112 and the fingerprint identification sensor 120, and the air gap AG is surrounded by the ring structure, but the invention is not limited thereto.

Since the first adhesive layer AD1 is not formed between the portion P2 of the microstructures 112 and the portion P4 of the fingerprint identification sensor 120, the transmission of the light beam L' reflected by the finger F and passing through the portion P2 of the microstructures 112 may be transmitted to the portion P4 of the fingerprint identification sensor 120 while not being affected by the first adhesive layer AD1.

The first adhesive layer AD1 may be a light-transmissive adhesive layer, and may be, for example, a light-curing adhesive layer, but the invention is not limited thereto. In the embodiment of FIG. 1A and FIG. 1B, since the light beam L' reflected by the finger F and passing through the portion P2 of the microstructures 112 is not affected by the first adhesive layer AD1, it is not necessary to limit the refractive index of the first adhesive layer AD1. In another embodiment, the first adhesive layer AD1 may be comprehensively adhered between the microstructures 112 and the fingerprint identification sensor 120 while the refractive index of the first adhesive layer AD1 is less than the refractive index of each of the microstructures 112, so as to reduce the effect of the first adhesive layer AD1 on the transmission of the light beam L' reflected by the finger F and passing through the microstructures 112.

The light source 130 is located under the inner surface S1 of the cover plate 110 and adjacent to the fingerprint identification sensor 120. FIG. 1B schematically illustrates four light sources 130, and the four light sources 130 are disposed at four sides of the fingerprint identification sensor 120; however, the amount of the light sources 130 and the relative disposition relation between the light sources 130 and the fingerprint identification sensor 120 are not limited to what is illustrated in FIG. 1B. In other embodiments, the light sources 130 may be disposed at each side, each corner or a combination thereof of the fingerprint identification sensor 120.

The light source 130 is adapted to emit a light beam L toward the cover plate 110. The light sources 130 may be visible light sources or invisible light sources. In other words, the light beam L may be visible light or invisible light.

Fingerprints of the finger F have troughs (see the thick lines in FIG. 1A) and peaks (the regions between the thick lines in FIG. 1A). When the user presses the outer surface S2 of the cover plate 110 with the finger F, the troughs and the peaks of the fingerprints will react differently to the light beam L (e.g. reflect or scatter the light beam L) and thereby the fingerprint identification sensor 120 may identify the user's identity according to the grayscale digital image of the received troughs and the peaks.

Other embodiments of the fingerprint identification modules will be described below with reference to FIGS. 2 to 8, where the same or similar elements are labeled by the same or similar reference numerals, and the materials, the relative disposition relation, the manufacturing method and effects thereof will not be described hereinafter. FIG. 2 to FIG. 7A are schematic partially cross-sectional diagrams respectively illustrating fingerprint identification modules according to a second embodiment to a seventh embodiment of the invention. FIG. 7B is a schematic partially top-view diagram illustrating the fingerprint identification module according to the seventh embodiment of the invention. FIG. 8 is a schematic partially cross-sectional diagram illustrating a fingerprint identification module according to an eighth embodiment of the invention.

Figure 2:
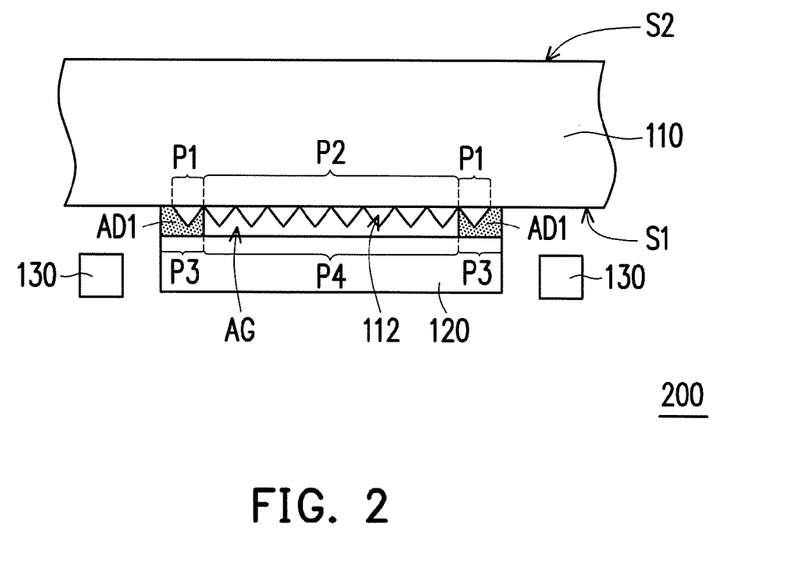

Referring to FIG. 2, a fingerprint identification module 200 is similar to the fingerprint identification module 100 illustrated in FIG. 1A. The main difference between the fingerprint identification module 200 and the fingerprint identification module 100 is described below. In the fingerprint identification module 200, the microstructures 212 are prism structures protruding from the inner surface S1 of the cover plate 210, but the invention is not limited thereto. In another embodiment, the microstructures 212 may also be triangular columnar structures protruding from the inner surface S1.

Figure 3:
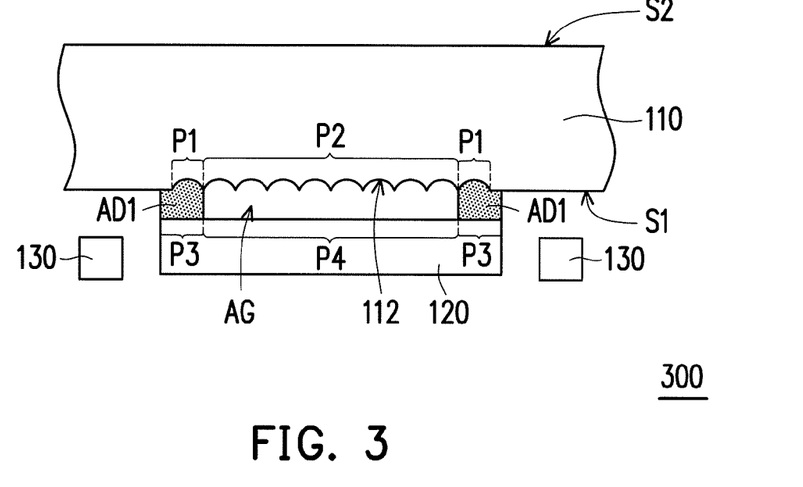

Referring to FIG. 3, a fingerprint identification module 300 is similar to the fingerprint identification module 100 illustrated in FIG. 1A. The main difference between the fingerprint identification module 300 and the fingerprint identification module 100 is described below. In the fingerprint identification module 300, the microstructures 112 are hollow structures recessed in the inner surface S1. For example, the microstructures 112 may be columnar recesses, such as semi-circular columnar grooves, but the invention is not limited thereto. In another embodiment, the microstructures 112 may be triangular columnar grooves. Specifically, the microstructures 112 may be formed by removing part of the cover plate 110. Namely, the microstructures 112 may be formed by a block substrate through a removal process, but the invention is not limited thereto. In another embodiment, the microstructures 112 and the cover plate 110 may be simultaneously manufactured in a molding manner.

Figure 4:
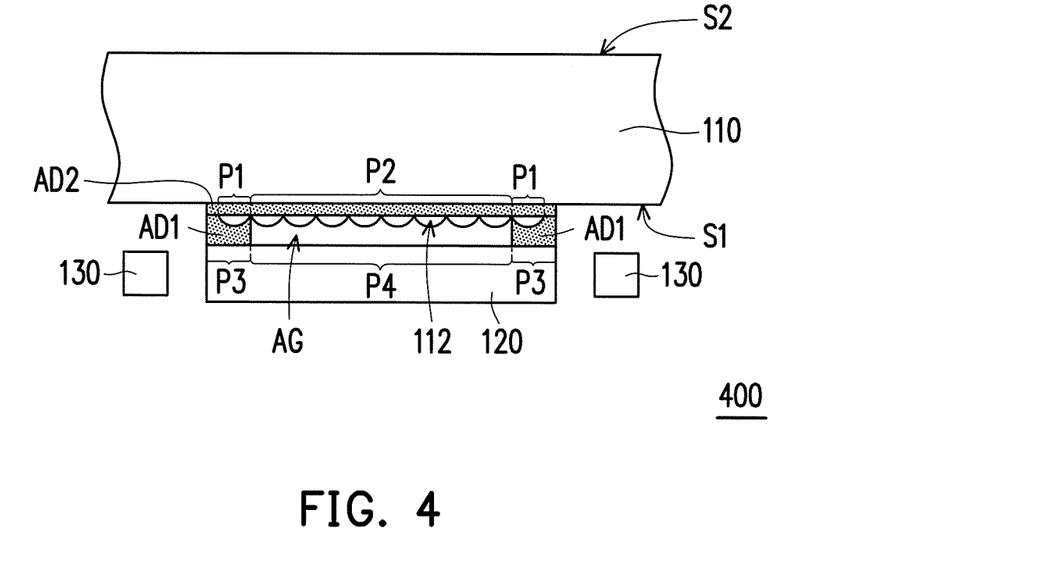

Referring to FIG. 4, a fingerprint identification module 400 is similar to the fingerprint identification module 100 illustrated in FIG. 1A. The main difference between the fingerprint identification module 400 and the fingerprint identification module 100 is described below. In the fingerprint identification module 400, the fingerprint identification module 400 further includes a second adhesive layer AD2, and the microstructures 112 are attached to the inner surface S1 of the cover plate 110 through the second adhesive layer AD2. Specifically, the microstructures 112 and the cover plate 110 may be separately manufactured and then attached together through the second adhesive layer AD2. The second adhesive layer AD2 may be a light-transmissive adhesive layer and may be, for example, a light-curing adhesive layer, but the invention is not limited thereto. In addition, a refractive index of the second adhesive layer AD2 may be identical to the refractive index of the cover plate 110, but the invention is not limited thereto.

In the embodiment, the second adhesive layer AD2 is comprehensively adhered between the microstructures 112 and the cover plate 110, but the invention is not limited thereto. In another embodiment, the second adhesive layer AD2 is only partially adhered between the microstructures 112 and the cover plate 110. For example, the second adhesive layer AD2 may adhere the microstructures 112 and the cover plate 110 by adopting the adhering manner of the first adhesive layer AD1 shown in FIG. 4, but the invention is not limited thereto.

Figure 5:
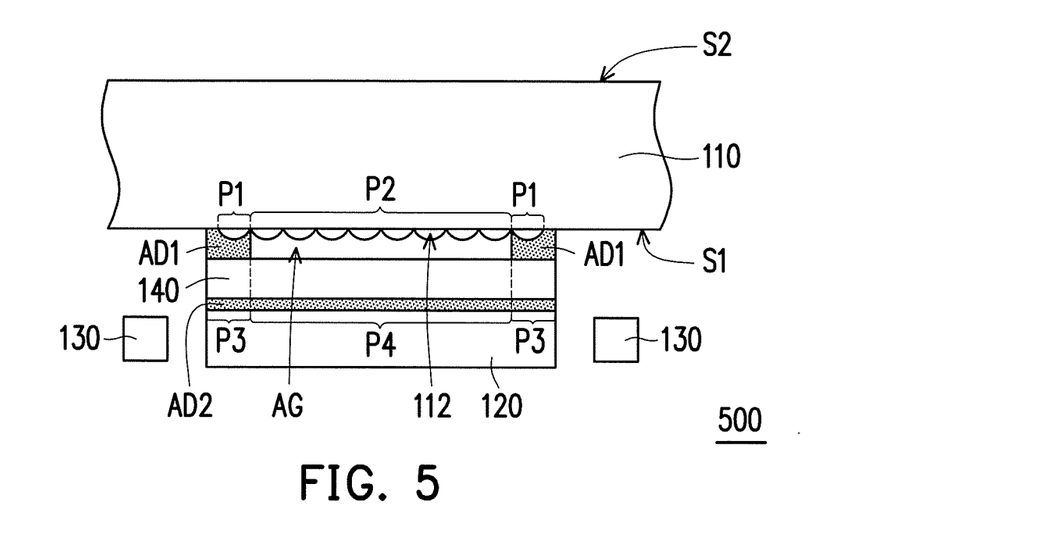

Referring to FIG. 5, a fingerprint identification module 500 is similar to the fingerprint identification module 100 illustrated in FIG. 1A. The main difference between the fingerprint identification module 500 and the fingerprint identification module 100 is described below. In the fingerprint identification module 500, the fingerprint identification module 500 further includes an optical element layer 140 and a second adhesive layer AD2.

The optical element layer 140 is located between the microstructures 112 and the fingerprint identification sensor 120, and the optical element layer 140 is attached to the microstructures 112 through the first adhesive layer AD1. Therefore, the air gap AG is located between the other portion P2 of the microstructures 112 and the optical element layer 140 located on the other portion P4 of the fingerprint identification sensor 120.

The optical element layer 140 is adapted to adjust the shape, the incident angle, or other optical characteristics of the light beam incident onto the fingerprint identification sensor 120. According to desired optical effects or the adopted light source 130, the optical element layer 140 may include a pinhole array element, a fiber array element, an anti-spy film, a light diffraction element, or a polarizer. The pinhole array element may include a plurality of pinholes disposed corresponding to the microstructures 112, wherein sizes of the pinholes (or the microstructures 112) may be altered based on different design requirements. The light diffraction element may include a grating, but the invention is not limited thereto. For example, the optical element layer 140 may include a pinhole array element, a fiber array element, or an anti-spy film to acquire a collimating effect. On the other hand, the optical element layer 140 may include a light diffraction element or a polarizer when the light source 130 includes a laser light source.

The fingerprint identification sensor 120 is attached to the optical element layer 140 through the second adhesive layer AD2. The second adhesive layer AD2 may be a light-transmissive adhesive layer and may be, for example, a light-curing adhesive layer, but the invention is not limited thereto. In the embodiment, the second adhesive layer AD2 is comprehensively adhered between the fingerprint identification sensor 120 and the optical element layer 140, but the invention is not limited thereto. In another embodiment, the second adhesive layer AD2 is only partially adhered between the fingerprint identification sensor 120 and the optical element layer 140. For example, the second adhesive layer AD2 may adhere the fingerprint identification sensor 120 and the optical element layer 140 by adopting the adhering manner of the first adhesive layer AD1 shown in FIG. 5, but the invention is not limited thereto.

In the embodiment of FIG. 5, the shape of the microstructures 112 may be changed to the shape of the microstructures 112 in FIGS. 1A to 3. In addition, the microstructures 112 and the cover plate 110 may not be integrally formed, and the microstructures 112 may be adhered to the inner surface S1 of the cover plate 110 through a third adhesive layer (not shown, referring to the second adhesive layer AD2 in FIG. 4). Moreover, the first adhesive layer AD1 may be comprehensively adhered between the microstructures 112 and the optical element layer 140, wherein the refractive index of the first adhesive layer AD1 is less than the refractive index of each of the microstructures 112, so as to reduce the effect of the first adhesive layer AD1 on the transmission of the light beam reflected by the finger and passing through the microstructures 112.

Figure 6:
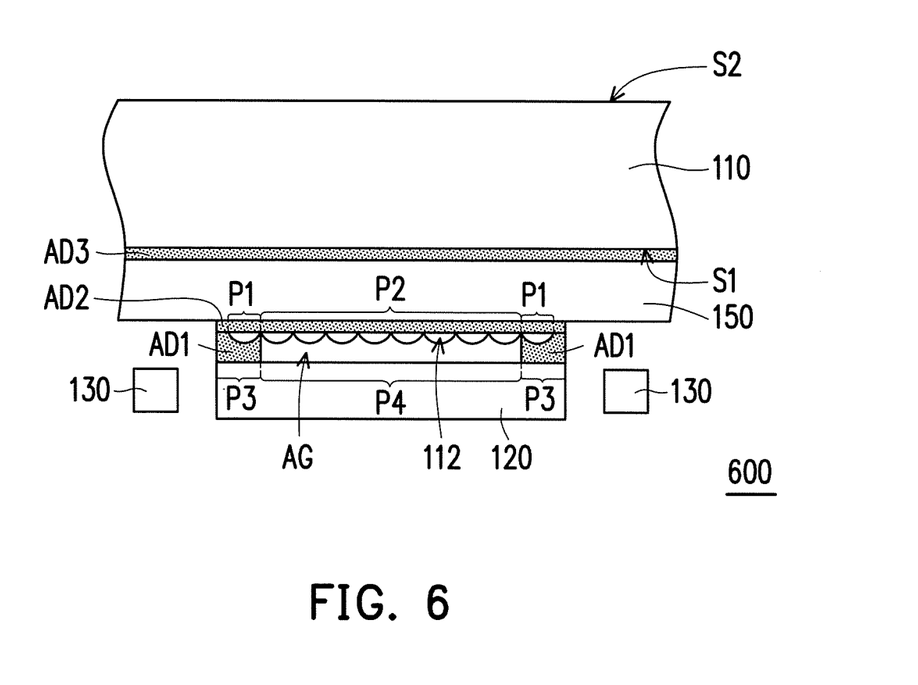

Referring to FIG. 6, a fingerprint identification module 600 is similar to the fingerprint identification module 100 illustrated in FIG. 1A. The main difference between the fingerprint identification module 600 and the fingerprint identification module 100 is described below. In the fingerprint identification module 600, the fingerprint identification module 600 further includes a display element 150, a second adhesive layer AD2, and a third adhesive layer AD3.

The display element 150 is located between the cover plate 110 and the microstructures 112. For example, the display element 150 is an organic light emitting display device, a liquid crystal display device, a micro light emitting diode display device, or other display elements that can provide images. Since the cover plate 110 located on the display element 150 can protect the display element 150 from being damaged due to the impact of an external force, the display element 150 may not need an additional cover plate. Alternatively, the cover plate of the display element 150 may serve as the cover plate 110 of the fingerprint identification module 600.

The microstructures 112 are attached to the display element 150 through the second adhesive layer AD2. The second adhesive layer AD2 may be a light-transmissive adhesive layer and may be, for example, a light-curing adhesive layer, but the invention is not limited thereto.

In the embodiment, the second adhesive layer AD2 is comprehensively adhered between the microstructures 112 and the display element 150, but the invention is not limited thereto. In another embodiment, the second adhesive layer AD2 is only partially adhered between the microstructures 112 and the display element 150. For example, the second adhesive layer AD2 may adhere the microstructures 112 and the display element 150 by adopting the adhering manner of the first adhesive layer AD1 shown in FIG. 6, but the invention is not limited thereto.

The display element 150 is attached to the cover plate 110 through the third adhesive layer AD3. The third adhesive layer AD3 may be a light-transmissive adhesive layer and may be, for example, a light-curing adhesive layer, but the invention is not limited thereto.

In the embodiment, the third adhesive layer AD3 is comprehensively adhered between the display element 150 and the cover plate 110, but the invention is not limited thereto. In another embodiment, the third adhesive layer AD3 is only partially adhered between the display element 150 and the cover plate 110. For example, the third adhesive layer AD3 may adhere the display element 150 and the cover plate 110 by adopting the adhering manner of the first adhesive layer AD1 shown in FIG. 6, but the invention is not limited thereto.

In the embodiment of FIG. 6, the shape of the microstructures 112 may be changed to the shape of the microstructures 112 in FIGS. 1A to 3. In addition, the first adhesive layer AD1 may be comprehensively adhered between the microstructures 112 and the fingerprint identification sensor 120 (i.e. the fingerprint identification sensor 120 is comprehensively covered by the adhesive layer AD1), wherein the refractive index of the first adhesive layer AD1 is less than the refractive index of each of the microstructures 112, so as to reduce the effect of the first adhesive layer AD1 on the transmission of the light beam reflected by the finger and passing through the microstructures 112. Moreover, the fingerprint identification module 600 may further include an optical element layer (not shown, referring to the optical element layer 140 in FIG. 5) and a fourth adhesive layer (not shown, referring to the second adhesive layer AD2 in FIG. 5), wherein the optical element layer is located between the microstructures 112 and the fingerprint identification sensor 120, and the fingerprint identification sensor 120 is attached to the optical element layer through the fourth adhesive layer. Besides, the air gap AG is located between the other portion P2 of the microstructures 112 and the optical element layer 140 located on the other portion P4 of the fingerprint identification sensor 120. The fourth adhesive layer may be comprehensively or partially adhered between the optical element layer and the fingerprint identification sensor 120.

Figure 7A:
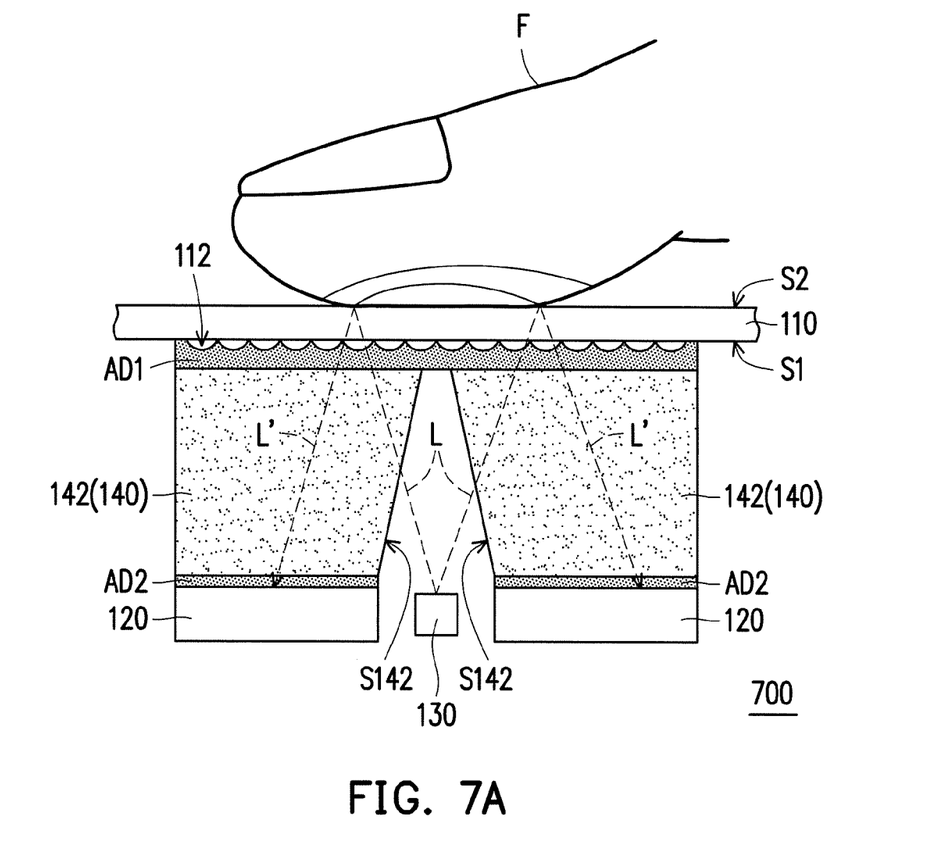
Figure 7B:
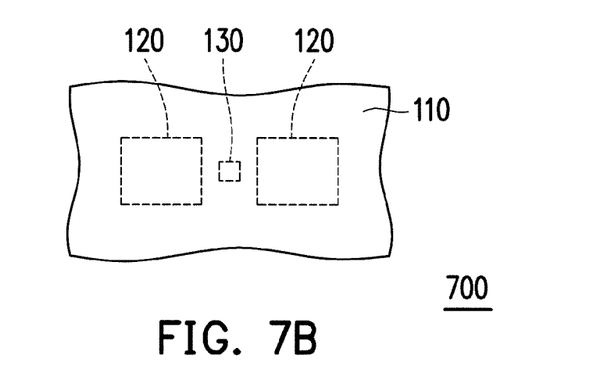
FIG. 7B is a schematic partially top-view diagram illustrating the fingerprint identification module according to the seventh embodiment of the invention.
Figure 8:
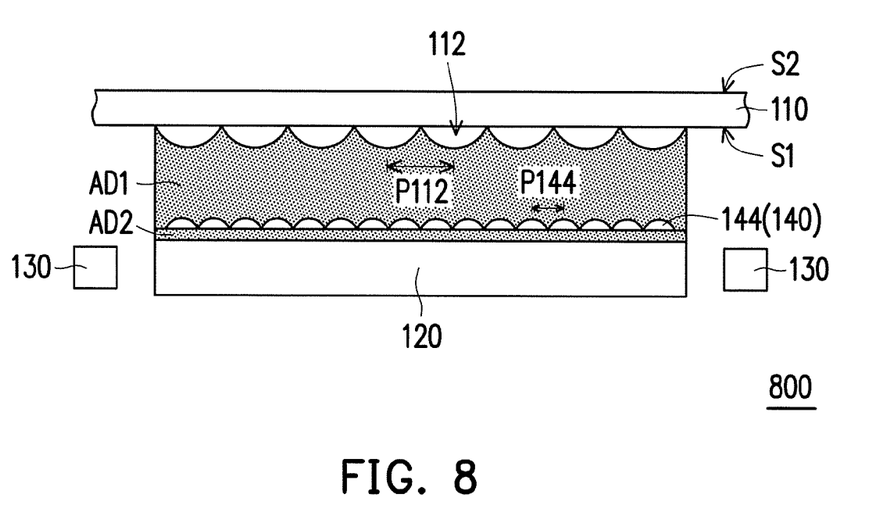
FIG. 8 is a schematic partially cross-sectional diagram illustrating a fingerprint identification module according to an eighth embodiment of the invention.

Referring to FIG. 7A and FIG. 7B, a fingerprint identification module 700 is similar to the fingerprint identification module 100 illustrated in FIG. 1A. The main difference between the fingerprint identification module 700 and the fingerprint identification module 100 is described below. In the fingerprint identification module 700, the fingerprint identification module 700 further includes an optical element layer 140 and a second adhesive layer AD2. Besides, the fingerprint identification module 700 includes a plurality of fingerprint identification sensors 120.

The optical element layer 140 is located between the microstructures 112 and the fingerprint identification sensor 120, and the optical element layer 140 is attached to the microstructures 112 through the first adhesive layer AD1. Therefore, the air gap AG is located between the other portion P2 of the microstructures 112 and the optical element layer 140 located on the other portion P4 of the fingerprint identification sensor 120.

The optical element layer 140 includes a plurality of light guide elements 142. The light source 130 is located between the light guide elements 142. The fingerprint identification sensors 120 are attached to the light guide elements 142 through the second adhesive layer AD2, respectively. The second adhesive layer AD2 may be a light-transmissive adhesive layer and may be, for example, a light-curing adhesive layer, but the invention is not limited thereto. In addition, a refractive index of the second adhesive layer AD2 may be identical to the refractive index of the light guide elements 142, but the invention is not limited thereto.

Each of the light guide elements 142 includes an inclined surface S142 tilted relative to the cover plate 110, and the inclined surface S142 of each of the light guide elements 142 is adjacent to the light source 130. The light beams L emitted from the light source 130 enter the light guide elements 142 through the inclined surface S142. Each of the light beams L entering the light guide elements 142 is transmitted to the finger F of the user after sequentially passing through a corresponding light guide element 142, the first adhesive layer AD1, the microstructures 112, and the cover plate 110. Each of the light beams L' reflected by the finger F is transmitted to a corresponding fingerprint identification sensor 120 after sequentially passing through the cover plate 110, the microstructures 112, the first adhesive layer AD1, the corresponding light guide element 142, and the second adhesive layer AD2.

In the embodiment, the first adhesive layer AD1 is comprehensively adhered between the microstructures 112 and the light guide elements 142, and the refractive index of the first adhesive layer AD1 is less than the refractive index of each of the microstructures 112, so as to reduce the effect of the first adhesive layer AD1 on the transmission of the light beam L' reflected by the finger F and passing through the microstructures 112, but the invention is not limited thereto. In another embodiment, the first adhesive layer AD1 may be only partially adhered between the microstructures 112 and the light guide elements 142. On the other hand, the second adhesive layer AD2 is comprehensively adhered between the light guide elements 142 and the fingerprint identification sensors 120, and the refractive index of the second adhesive layer AD2 is less than the refractive index of each of the light guide elements 142, but the invention is not limited thereto. In another embodiment, the second adhesive layer AD2 may be only partially adhered between the light guide elements 142 and the fingerprint identification sensors 120.

In the embodiment of FIG. 7A and FIG. 7B, the shape of the microstructures 112 may be changed to the shape of the microstructures 112 in FIGS. 1A to 3. In addition, the microstructures 112 and the cover plate 110 may not be integrally formed, and the microstructures 112 may be adhered to the inner surface S1 of the cover plate 110 through a third adhesive layer (not shown, referring to the second adhesive layer AD2 in FIG. 4). The third adhesive layer may be comprehensively or partially adhered between the microstructures 112 and the inner surface S1 of the cover plate 110. Moreover, the fingerprint identification module 700 may further include a display element (not shown, referring to the display element 150 in FIG. 6) and a fourth adhesive layer (not shown, referring to the third adhesive layer AD3 in FIG. 6), wherein the display element is located between the cover plate 110 and the microstructures 112, the microstructures 112 are attached to the display element through the third adhesive layer, and the display element is attached to the cover plate 110 through the fourth adhesive layer. The fourth adhesive layer may be comprehensively or partially adhered between the display element and the cover plate 110.

Referring to FIG. 8, a fingerprint identification module 800 is similar to the fingerprint identification module 100 illustrated in FIG. 1A. The main difference between the fingerprint identification module 800 and the fingerprint identification module 100 is described below. In the fingerprint identification module 800, the fingerprint identification module 800 further includes an optical element layer 140 and a second adhesive layer AD2.

The optical element layer 140 is located between the microstructures 112 and the fingerprint identification sensor 120, and the optical element layer 140 is attached to the microstructures 112 through the first adhesive layer AD1.

The optical element layer 140 includes a plurality of microstructures 144, and a pitch P144 of the microstructures 144 of the optical element layer 140 is smaller than a pitch P112 of the microstructures 112 located at the inner surface S1 of the cover plate 110. Specifically, the microstructures 112 located at the inner surface S1 of the cover plate 110 are adapted to collimate the light beam reflected by the finger of the user, while the microstructures 144 of the optical element layer 140 are adapted to converge the light beam from the microstructures 112 into the fingerprint identification sensor 120. Each of the microstructures 144 may be disposed corresponding to a single sensing area of the fingerprint identification sensor 120. Alternatively, each of the microstructures 144 may be disposed corresponding to multiple sensing areas of the fingerprint identification sensor 120.

In the embodiment, the microstructures 144 of the optical element layer 140 and the microstructures 112 located at the inner surface S1 of the cover plate 110 are both columnar structures (e.g. semi-cylindrical structures), but the invention is not limited thereto. In another embodiment, the microstructures 144 of the optical element layer 140 and the microstructures 112 located at the inner surface S1 of the cover plate 110 may be both columnar recesses (e.g. semi-circular columnar grooves).

The fingerprint identification sensor 120 is attached to the optical element layer 140 through the second adhesive layer AD2. The second adhesive layer AD2 may be a light-transmissive adhesive layer and may be, for example, a light-curing adhesive layer, but the invention is not limited thereto.

In the embodiment, the first adhesive layer AD1 is comprehensively adhered between the microstructures 112 and the optical element layer 140, and the refractive index of the first adhesive layer AD1 is less than the refractive index of each of the microstructures 112, so as to reduce the effect of the first adhesive layer AD1 on the transmission of the light beam reflected by the finger and passing through the microstructures 112, but the invention is not limited thereto. In another embodiment, the first adhesive layer AD1 may be only partially adhered between the microstructures 112 and the optical element layer 140. On the other hand, the second adhesive layer AD2 is comprehensively adhered between the optical element layer 140 and the fingerprint identification sensors 120, and the refractive index of the second adhesive layer AD2 is less than the refractive index of each of the microstructures 144, but the invention is not limited thereto. In another embodiment, the second adhesive layer AD2 may be only partially adhered between the optical element layer 140 and the fingerprint identification sensors 120.

In the embodiment of FIG. 8, the shape of the microstructures 112 may be changed to the shape of the microstructures 112 in FIGS. 1A to 3. In addition, the microstructures 112 and the cover plate 110 may not be integrally formed, and the microstructures 112 may be adhered to the inner surface S1 of the cover plate 110 through a third adhesive layer (not shown, referring the second adhesive layer AD2 in FIG. 4). The third adhesive layer may be comprehensively or partially adhered between the microstructures 112 and the inner surface S1 of the cover plate 110. Moreover, the fingerprint identification module 700 may further include a display element (not shown, referring to the display element 150 in FIG. 6) and a fourth adhesive layer (not shown, referring to the third adhesive layer AD3 in FIG. 6), wherein the display element is located between the cover plate 110 and the microstructures 112, the microstructures 112 are attached to the display element through the third adhesive layer, and the display element is attached to the cover plate 110 through the fourth adhesive layer. The fourth adhesive layer may be comprehensively or partially adhered between the display element and the cover plate 110.

In light of the foregoing, the invention can facilitate in improving the identification performance of the fingerprint identification module by collimating and focusing a light beam reflected by a finger on the fingerprint identification sensor with the disposition of the microstructures. A portion (e.g. the sensing area) of the fingerprint identification sensor is exposed by the first adhesive layer to prevent the transmission of the light beam from being affected, so that the identification performance of the fingerprint identification module is further improved. An optical element layer is disposed between the microstructures and the fingerprint identification sensor according to desired optical effects. Therefore, the fingerprint identification module of the invention can have good identification performance.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A fingerprint identification module, comprising:
    a cover plate, having an inner surface, an outer surface opposite to the inner surface, and a plurality of microstructures located at the inner surface;
    a fingerprint identification sensor, located under the microstructures;
    a first adhesive layer, wherein the fingerprint identification sensor is attached to the microstructures through the first adhesive layer, the first adhesive layer is adhered between a portion of the microstructures and a portion of the fingerprint identification sensor, and an air gap is located between the other portion of the microstructures and the other portion of the fingerprint identification sensor; and
    at least one light source, located under the inner surface and adjacent to the fingerprint identification sensor.

2. The fingerprint identification module according to claim 1, wherein the cover plate is a cover plate of a display apparatus disposed on the fingerprint identification module or a cover plate of a touch apparatus disposed on the fingerprint identification module.

3. The fingerprint identification module according to claim 1, wherein the microstructures are hollow structures recessed in the inner surface.

4. The fingerprint identification module according to claim 1, wherein the microstructures are prism structures or columnar structures protruding from the inner surface.

5. The fingerprint identification module according to claim 1, wherein the microstructures and the cover plate are integrally formed.

6. The fingerprint identification module according to claim 1, wherein the first adhesive layer includes a ring structure disposed between the microstructures and the fingerprint identification sensor, and the air gap is surrounded by the ring structure.

7. The fingerprint identification module according to claim 1, further comprising:
    a second adhesive layer, wherein the microstructures are attached to the inner surface of the cover plate through the second adhesive layer.

8. The fingerprint identification module according to claim 1, further comprising:
    a display element, located between the cover plate and the microstructures;
    a second adhesive layer, wherein the microstructures are attached to the display element through the second adhesive layer; and
    a third adhesive layer, wherein the display element is attached to the cover plate through the third adhesive layer.

9. The fingerprint identification module according to claim 8, further comprising:
    an optical element layer, located between the microstructures and the fingerprint identification sensor; and a fourth adhesive layer, wherein the fingerprint identification sensor is attached to the optical element layer through the fourth adhesive layer, and the optical element layer, the fourth adhesive layer, and the fingerprint identification sensor are attached to the microstructures through the first adhesive layer.

10. The fingerprint identification module according to claim 9, wherein the optical element layer includes a pinhole array element, a fiber array element, an anti-spy film, a light diffraction element, or a polarizer.

11. A fingerprint identification module, comprising:
a cover plate, having an inner surface, an outer surface opposite to the inner surface, and a plurality of microstructures located at the inner surface;
a fingerprint identification sensor, located under the microstructures;
an optical element layer, located between the microstructures and the fingerprint identification sensor;
a first adhesive layer, wherein the optical element layer is attached to the microstructures through the first adhesive layer;
a second adhesive layer, wherein the fingerprint identification sensor is attached to the optical element layer through the second adhesive layer; and
at least one light source, located under the inner surface and adjacent to the fingerprint identification sensor.

12. The fingerprint identification module according to claim 11, wherein the optical element layer includes a pinhole array element, a fiber array element, an anti-spy film, a light diffraction element, or a polarizer.

13. The fingerprint identification module according to claim 11, wherein the first adhesive layer is located between a portion of the microstructures and a portion of the fingerprint identification sensor, and an air gap is located between the other portion of the microstructures and the optical element layer located on the other portion of the fingerprint identification sensor.

14. The fingerprint identification module according to claim 11, wherein the fingerprint identification sensor is comprehensively covered by the first adhesive layer, and a refractive index of the first adhesive layer is less than a refractive index of each of the microstructures.

15. The fingerprint identification module according to claim 11, wherein the optical element layer includes a plurality of light guide elements, and the at least one light source is located between the light guide elements, wherein the fingerprint identification module further comprising:
a plurality of the fingerprint identification sensors, attached to the light guide elements through the second adhesive layer, respectively.

16. The fingerprint identification module according to claim 15, wherein each of the light guide elements includes an inclined surface tilted relative to the cover plate, and the inclined surface of each of the light guide elements is adjacent to the at least one light source.

17. The fingerprint identification module according to claim 11, wherein the optical element layer includes a plurality of microstructures, and a pitch of the microstructures of the optical element layer is smaller than a pitch of the microstructures located at the inner surface.

18. The fingerprint identification module according to claim 17, wherein the microstructures of the optical element layer and the microstructures located at the inner surface are columnar structures or columnar recesses.

* * * * *